United States Patent [19]

Takeuchi

[11] 4,441,405

[45] Apr. 10, 1984

[54] SOLAR RADIATION HEAT INFLUX SENSOR FOR AN AUTOMOTIVE VEHICLE

[75] Inventor: Yasuhisa Takeuchi, Yokosuka, Japan

[73] Assignee: Nissan Motor Company, Limited, Yokohama, Japan

[21] Appl. No.: 350,883

[22] Filed: Feb. 22, 1982

[30] Foreign Application Priority Data

Mar. 12, 1981 [JP] Japan ................................ 56-34535
Mar. 18, 1981 [JP] Japan ................................ 56-39184

[51] Int. Cl.³ ........................ B60H 1/00; G01K 17/00
[52] U.S. Cl. ...................................... 98/201; 374/29; 374/32; 374/112; 236/94
[58] Field of Search ........................ 165/11 R; 236/94; 374/29-32, 40, 41, 45, 112-114, 134, 135; 98/2.01

[56] References Cited

U.S. PATENT DOCUMENTS

| | | | |
|---|---|---|---|
| 2,398,606 | 4/1946 | Wang | 374/113 X |
| 2,560,536 | 7/1951 | Althouse | 374/32 |
| 2,764,021 | 9/1956 | Sims et al. | 374/31 |
| 4,332,164 | 6/1982 | Schlesinger et al. | 374/41 |
| 4,362,404 | 12/1982 | Armstrong | 374/39 |

Primary Examiner—Herbert Goldstein
Attorney, Agent, or Firm—Schwartz, Jeffery, Schwaab, Mack, Blumenthal & Koch

[57] ABSTRACT

A solar radiation heat influx sensor mounted within an automotive vehicle fender mirror housing, which can accurately detect solar radiation heat influx due to rays of sunlight falling upon the vehicle. The detected heat influx value is used in controlling an automotive vehicle air-conditioning system to adjust passenger compartment air temperature, more specifically to determine an appropriate air conditioning air mix door opening percentage. The solar radiation heat influx sensor according to the present invention comprises a sensor body having inlet and outlet portions and a central window, a blower to drive air therethrough, an outside-air temperature sensor disposed in the inlet portion thereof and a warmed-air temperature sensor disposed in the outlet portion thereof, and a calculating unit to calculate solar radiation heat influx in response to the two detected temperatures in accordance with a predetermined equation.

12 Claims, 9 Drawing Figures

SOLAR RADIATION HEAT INFLUX SENSOR FOR AN AUTOMOTIVE VEHICLE

BACKGROUND OF THE INVENTION

1. Field of the Invention

The present invention relates to a solar radiation heat influx sensor for an automotive vehicle which can accurately detect solar radiation heat influx due to rays of sunlight falling on the vehicle body in order to adjust an air-conditioning system for controlling passenger compartment air temperature.

2. Description of the Prior Art

Conventionally, there exist solar radiation heat influx sensors for an automotive vehicles such that a first temperature, $T_1$, at a position within a passenger compartment where solar radiation is directly applied, and a second temperature, $T_2$, at another position within the passenger compartment where no solar radiation is directly applied, are detected separately. The solar radiation heat influx is obtained by multiplying the difference in temperature between $T_1$ and $T_2$ by a predetermined correction factor. See, for example Japan, Published unexamined patent application No. S55-72410.

In the above-mentioned prior-art solar radiation heat influx sensor, the sensor detecting the temperature $T_1$ is disposed at a position subject to insolation, for instance, on the top of an instrument panel or on a rear parcel shelf; the sensor detecting the temperature $T_2$ is disposed at a position not subject to insolation, for instance, under the instrument panel.

In general, when a vehicle is travelling, however, the position subject to solar energy within a passenger compartment varies according to the direction in which the vehicle is travelling or according to the time at which the vehicle is travelling. For example, even if a solar radiation heat influx sensor is disposed on top of an instrument panel so as to receive solar energy through the front windshield glass, it will cool to normal passenger compartment temperature when the vehicle is not travelling toward the sun. It is practically impossible for a single sensor to receive solar energy at all times and, therefore, impossible to accurately detect solar radiation heat influx by this method.

Further, the flow of air within the passenger compartment varies according to the operating conditions of the air-conditioning system. When the flow of air varies, the correction factor, multiplied by the difference in temperature between $T_1$ and $T_2$ to obtain solar radiation heat influx, also varies. Since the correction factor for the above-mentioned sensor must be predetermined under average conditions, it is impossible to accurately detect solar radiation heat influx as conditions change.

SUMMARY OF THE INVENTION

With these problems in mind, therefore, it is the primary object of the present invention to provide a solar radiation heat influx sensor in which solar radiation heat influx is measured by way of the difference in temperature between the air inlet position and an air outlet position of a small chamber disposed in the vehicle, upon which sunlight is allowed to fall and through which air is flowing.

To achieve the above-mentioned objects, the solar radiation heat influx sensor for an automotive vehicle according to the present invention comprises a sensor body having an air inlet portion and an air outlet portion at either end, a window upon which rays of sunlight are allowed to fall in the middle portion of the sensor body, a blower for driving air through the sensor body, an outside-air temperature sensor disposed in the inlet portion of the sensor body, a warmed-air temperature sensor disposed in the outlet portion of the sensor body, and a calculating unit for calculating solar radiation heat influx in response to outside-air temperature and warmed-air temperature detected by the sensors, respectively, in accordance with a predetermined equation.

BRIEF DESCRIPTION OF THE DRAWINGS

The features and advantages of the solar radiation heat influx sensor for an automotive vehicle according to the present invention will be more clearly appreciated from the following description taken in conjunction with the accompanying drawings in which like reference numerals designates corresponding elements and in which.

DETAILED DESCRIPTION OF THE PREFERRED EMBODIMENTS

With reference to the attached drawings, there is described a solar radiation heat influx sensor according to the present invention with reference to the attached drawings.

Figure 1:
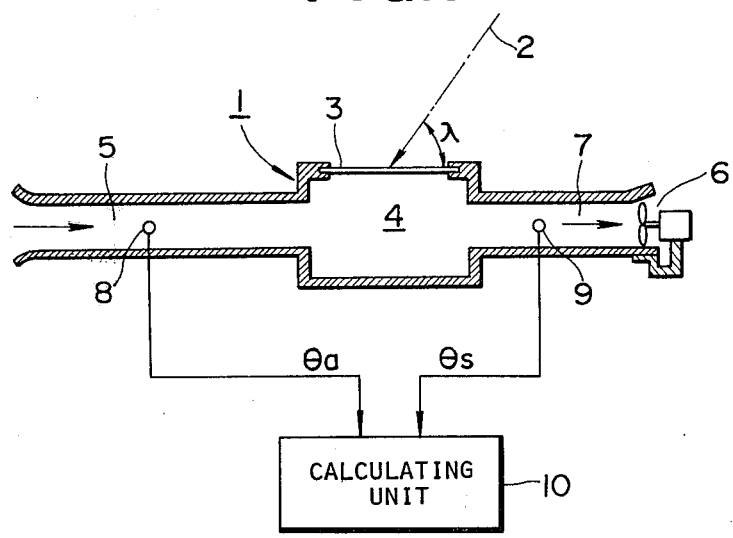
FIG. 1 is a diagrammatical illustration of a first embodiment of the solar radiation heat influx sensor according to the present invention.

FIG. 1 shows a first embodiment according to the present invention. First, follows a description of the structure thereof.

In the figure, the reference numeral 1 denotes a sensor body having a small chamber 4 covered by a window 3 at the center thereof through which rays 2 of sunlight can pass. At one end of the small chamber 4, there is provided an air inlet 5; at the other end of the small chamber 4, there is provided an air outlet 7 at which a small blower 6 is disposed to create a given flow of air through the small chamber to the outside. Within the air inlet 5, there is disposed an outside-air temperature sensor 8 such as a thermistor to detect outside air temperature $\theta a$; within the air outlet 7, there is disposed a warmed-air temperature sensor 9 to detect temperature $\theta s$ of air heated by sunlight after the air has passed through the small chamber 4. The temperatures $\theta a$ and $\theta s$ detected by the outside-air temperature sensor 8 and the warmed-air temperature sensor 9, respectively, are applied to a solar radiation heat influx calculating unit 10, by which solar radiation heat influx Qs within a passenger compartment can be calculated by the method described hereinbelow.

The sensor body 1 used for this embodiment according to the present invention is mounted at a position exposed to sunlight on the outside of the vehicle body, for instance, on the roof, front fender, rear fender etc. It may be convenient to use the above-mentioned outside-air temperature sensor 8 in common with another outside-air temperature sensor used with an air-conditioning system for an automotive vehicle.

Next, follows a description of the operation of the solar radiation heat influx sensor according to the present invention. First, the small blower 6 induces air to flow at a rate q (kg/sec) from the air inlet 5 to the air outlet 7. If sunlight falls upon the small chamber 4 at an angle of incidence $\lambda$ and if the flux of energy through a surface perpendicular to the direction of rays of sunlight 2 is given as L (kcal/sec.m$^2$), solar energy entering the small chamber 4 at an angle of incidence $\lambda$ can be expressed as $LS_1 \sin \lambda$, where the symbol $S_1$ denotes the surface area of the window 3.

On the other hand, the heat quantity inherent in the air flowing from the air inlet 5 into the small chamber 4 within a unit of time can be expressed as $qCp\theta a$ (kcal/sec), where q is the quantity of air (kg/sec) introduced into the small chamber 4, Cp is a gravimetric specific heat Cp=0.24 (kcal/kg°C.) and $\theta a$ is the temperature of air flowing through the air inlet 5 (outside-air temperature).

Further, the heat content of the air discharged from the small chamber 4 within a unit of time period can be expressed as $qCp\theta s$ (kcal/sec), where $\theta s$ is the temperature of air flowing through the air outlet 7 (solar radiation temperature).

Therefore, the following heat equilibrium equation can be obtained for the air flowing through the sensor body 1:

$$LS_1 \sin \lambda + qCp\theta a - qCp\theta s = 0 \qquad (1)$$

From this, solar energy L can be expressed as $$L = \frac{qCp(\theta s - \theta a)}{S_1 \sin \lambda} \qquad (2)$$

Since the angle of incidence $\lambda$ in the equation (2) is not known, however, it is impossible to directly obtain solar energy L.

In order to practice the present invention, since it is desirable to be able to determine the solar radiation heat quantity, Qs, due to sunlight within a passenger compartment. There now follows a description of relationship between Qs and $\lambda$.

Figure 5:
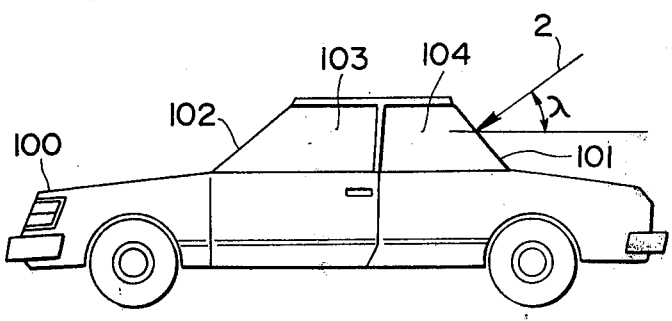
FIG. 5 is a pictorial view of a vehicle on which the solar radiation heat influx sensor according to the present invention is mounted and upon which sunlight falls.

An assumption is made that rays of sunlight fall, at an angle of incidence $\lambda$ to a horizontal surface, upon a vehicle body having windows 102 and 101 at its front and rear ends respectively and on its right and left sides, as shown in FIG. 5. Here, if the entire windshield area of a vehicle is assumed to be a single equivalent light-receiving area $S_2$ obtained when the combined windshield area is projected onto a reference surface parallel to the window 3, the solar radiation heat influx Qs is a follows:

$$Qs = LS_2 \sin \lambda \qquad (3)$$

In the above equation, although $S_2$ varies as $\lambda$ varies, it is possible to obtain an average value of the converted windshield area $S_2$ experimentally. Therefore, by substituting the equation (2) into the equation (3), the following equation can be obtained:

$$Qs = \frac{qCp(\theta s - \theta a)}{S_1 \sin \lambda} S_2 \sin \lambda \qquad (4)$$

$$= \frac{S_2}{S_1} qCp(\theta s - \theta a)$$

Since $S_1$, $S_2$, q and Cp are all constants, when the outside-air temperature $\theta a$ and warmed-air temperature $\theta s$ are detected by the embodiment shown in FIG. 1, it is possible to detect solar radiation heat influx Qs into the passenger compartment irrespective of an angle of incidence $\lambda$.

Figure 2:
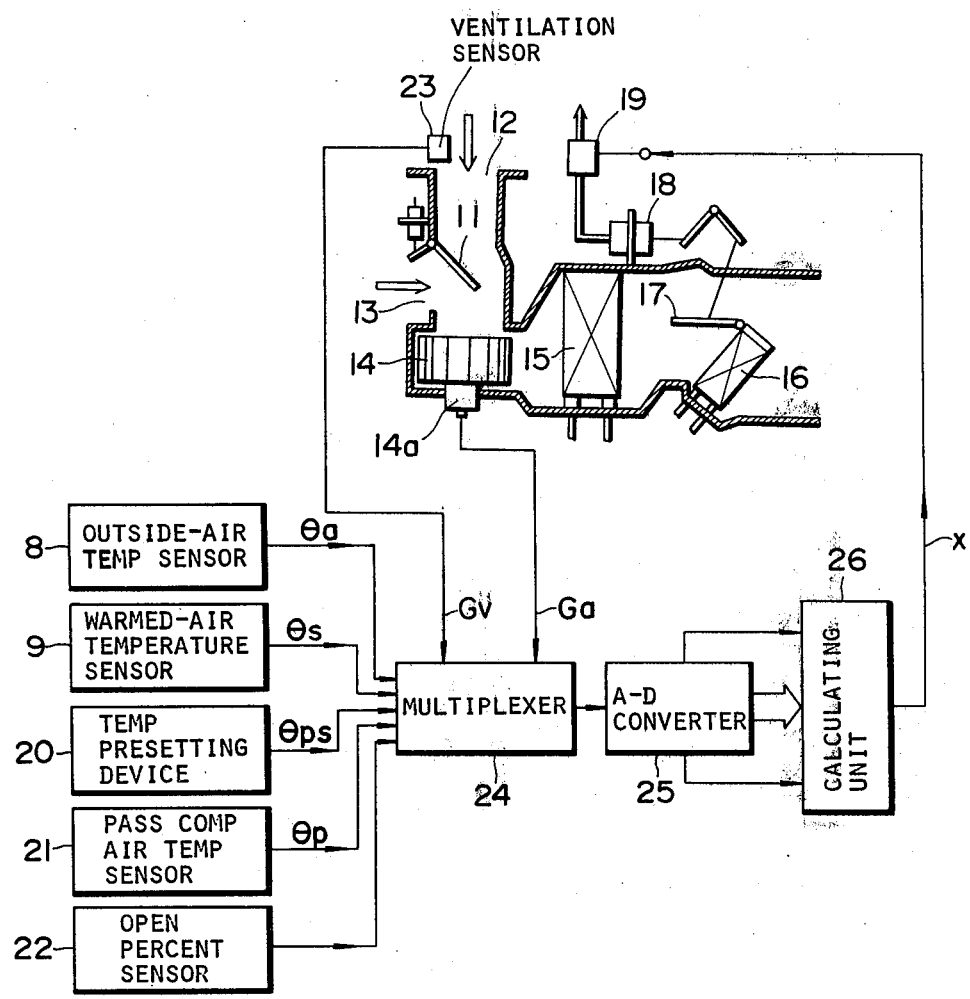
FIG. 2 is a combined pictorial and a schematic diagram of an air-conditioning system for controlling passenger compartment air temperature in accordance with values detected by the solar radiation heat influx sensor according to the present invention.

FIG. 2 shows an air-conditioning system in which the solar radiation heat influx sensor of the embodiment shown in FIG. 1 is used.

Figure 3:
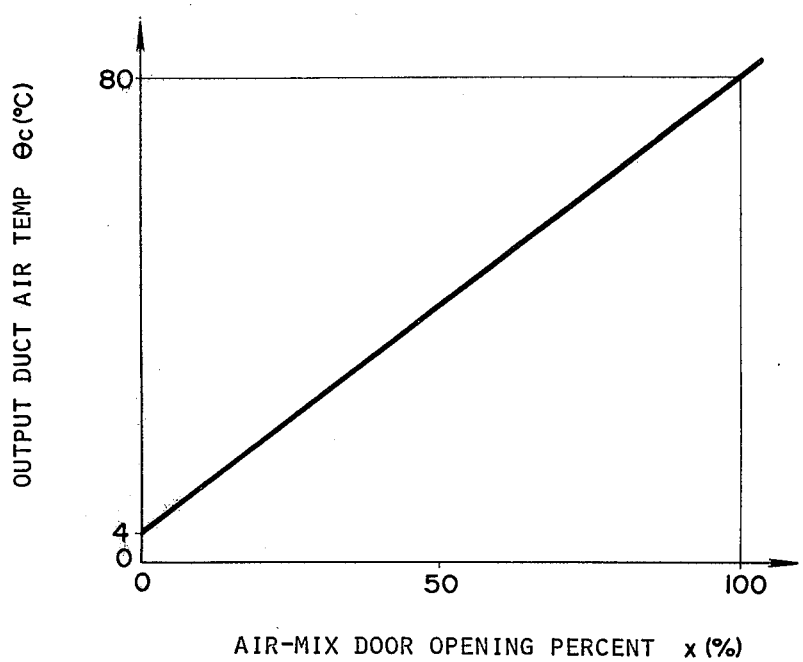
FIG. 3 is a graphical representation showing the relationship between air-mix door opening percentage X and output duct air temperature $\theta c$ in the air-conditioning system shown in FIG. 2.

First, the air-conditioning unit (mechanical assembly of the air-conditioning system) comprises an intake door 11 for switching air introduction modes from outside-air introduction mode via an outside-air introduction duct 12 to inside-air recirculation mode via an inside-air recirculation duct 13 or vice versa. The air drawn in by a blower fan 14 driven by a blower motor 4a is cooled and dehumidified by an evaporator 15. Part of the cooled and dehumidified air is reheated by passing it through a heater core 16 through which engine coolant is circulated. The ratio of reheated air to unreheated air, i.e., the percentage of air passing through the heater core 16, is determined by the opening percentage of the air mix door 17. The reheated and unreheated portions of the air then remix and are outputted into the passenger compartment through an output air duct (not shown). The opening percentage of the air mix door 17 is actuated by a vacuum actuator 18 via a link and rod. To the vacuum actuator 18, there is applied a vacuum output signal from an voltage-to-pressure transducer 19 in order to adjust the actuation vacuum pressure from a vacuum source in accordance with an opening percentage command signal X, so that the air mix door 17 is actuated to a position according to the opening percentage command signal X. In this case, air mix door opening percentage (%) is proportional to output duct air temperature ($\theta c$) as shown in FIG. 3.

There now follows a description of the control system. In FIG. 2, the reference numeral 8 denotes the outside-air temperature sensor provided within the sensor body 1 shown in FIG. 1. The reference numeral 9 denotes the warmed-air temperature sensor also provided within the sensor body 1 shown in FIG. 1. The reference numeral 20 denotes a temperature presetting device for presetting a passenger compartment target air temperature $\theta ps$. The numeral 21 denotes a passenger compartment air temperature sensor for detecting passenger compartment air temperature $\theta p$, the numeral 22 denotes an opening percentage sensor for detecting the opening percentage of the air mix door 17, and the numeral 23 denotes a ventilation sensor provided in the outside-air introduction duct 12 to detect fresh air intake quantity $Gv$. The reference numeral 24 denotes a multiplexer for sequentially conducting various signals including the air volume signal $Ga$ outputted by the blower motor 14a, the respective sensors and the passenger compartment air temperature presetting device. In addition the numeral 25 denotes an A-D converter and the numeral 26 denotes a calculating unit for producing an opening percentage command signal $X$ to open the air mix door 17 after executing predetermined calculations, during which the solar radiation heat influx $Qs$ determined by the above-mentioned equation (4) is also calculated.

The control calculation for obtaining an opening percentage command signal $X$ for the air-conditioning system shown in FIG. 2 will now be discussed.

First, temperature variation within a passenger compartment with respect to time can be given by the following equation:

$$C\frac{d\theta p}{dt} = Qc + Qt + Qv + Qs + Qm + Qe \quad (5)$$

where $Qc$ is the heat influx due to the air conditioning system, $Qt$ is the heat influx conducted through surfaces such as roof, doors, or window shields, $Qv$ is the ventilation heat influx, $Qs$ is the heat influx due to solar radiation, $Qm$ is the heat quantity generated by passengers, $Qe$ is the heat quantity generated by equipment such as a car radio mounted on a vehicle, and $C$ is the heat capacity of the passenger compartments.

The above-mentioned $Qc$, $Qt$ and $Qv$ can be expressed as follows, respectively:

$$Qc = GaCp(\theta c - \theta p) \quad (6)$$

$$Qt = K(\theta a - \theta p) \quad (7)$$

$$Qv = GvCp(\theta a - \theta p) \quad (8)$$

where $Qc$ is the output duct air temperature, and $K$ is the thermal conductivity of the walls of a passenger compartment (approximately $K = 0.01$ kcal/°C.sec)

Now, when the equations (6), (7), and (8) are all substituted into the equation (5), $$C\frac{d\theta p}{dt} = GaCp(\theta c - \theta p) + K(\theta a - \theta p) + \quad (9)$$

$$GvCp(\theta a - \theta p) + Qs + Qm + Qe$$

where $Qm$ and $Qe$ are easily-obtainable constants.

In the equation (9), if passenger compartment air temperature $\theta p$ is equal to preset passenger compartment air temperature $\theta ps$, that is, heat equilibrium has been achieved, then passenger compartment temperature $\theta p$ will be held substantially constant, i.e., $$\frac{d\theta p}{dt} = 0$$

Therefore, the output duct air temperature $\theta c'$ can be expressed as follows:

$$\theta c' = \frac{1}{GaCp} [\{K + (Ga + Gv)Cp\}\theta ps - \quad (10)$$

$$(K + GvCp)\theta a - Qs - Qm - Qe]$$

The relationship between output duct air temperature $\theta c$ and opening percentage $X$ can be obtained on the basis of the graphical representation shown in FIG. 3 as follows:

$$\theta c = \frac{76}{100} X + 4 \quad (11)$$

$$X = \frac{100}{76} (\theta c - 4) \quad (12)$$

By substituting $\theta c'$ expressed in the equation (10) into the equation (12), it is possible to obtain air-mix door opening percentage $X'$ as follows:

$$X' = \frac{100}{76GaCp} [\{K + (Ga + Gv)Cp\}\theta ps - \quad (13)$$

$$(K + GvCp)\theta a - Qs - Qm - Qe) - \frac{400}{76}$$

$$= \frac{100\{K + (Ga + Gv)Cp\}}{76GaCp} \theta ps -$$

$$\frac{100\{(K + GvCp)Qa + Qs\}}{76GaCp} - \frac{100(Qm + Qe)}{76GaCp} - \frac{100}{76}$$

However, the air-mix door opening percentage $X'$ obtained by this equation 13 is not directly used to obtain the opening percentage command signal, but is used as part of a proportional control method where the difference $(\theta ps - \theta p)$ between preset passenger compartment air temperature and detected passenger compartment air temperature is taken into consideration. Accordingly, opening percentage command signal $X$ can be given as follows:

$$X = X' + \epsilon(\theta ps - \theta p) \quad (14)$$

where $\epsilon$ is a proportionality constant.

Therefore, the calculating unit 26 receives the data necessary to calculate the opening percentage $X$ on the basis of the equations (13) and (14) from the multiplexer 24 and the A-D converter 25, and then calculates air-mix door opening percentage $X + \Delta X$ on the basis of the following equation (15), which is obtained from equations (13) and (14), at a predetermined time after the data has been received, and outputs a signal corresponding to the resulting opening percentage $X + \Delta X$ to the voltage-to-pressure transducer 19.

$$X + \Delta X = \left[ \frac{100\{K + (Ga + Gv)Cp\}}{76GaCp} + \epsilon \right] \theta ps - \quad (15)$$

-continued $$\left[ \epsilon\theta r + \frac{100(K + GvCp)}{76GaCp} \theta a + \right.$$

$$\left. \left( \frac{100(Qm + Qe)}{76GaCp} + \frac{100}{76} \right) + \frac{100Qs}{76QaCp} \right]$$

Further, since solar radiation heat influx Qs in the above equation (15) can be obtained on the basis of the equation (4) from the sensor according to the present invention, the calculating unit 26 calculates and outputs opening percentage command signal $X+\Delta X$ on the basis of the following equation:

$$X + \Delta X = \left[ \frac{100\{K + (Ga + Gv)Cp\}}{76GaCp} + \epsilon \right] \theta ps - \quad (16)$$

$$\left[ \epsilon\theta r + \left( \frac{100(Qm + Qe)}{76GaCp} + \frac{100}{76} \right) + \right.$$

$$\left. \frac{100\left\{ \left( K + GvCp - \frac{S_2}{S_1} qCp \right) \theta a + \frac{S_2}{S_1} qCp\theta s \right\}}{76GaCp} \right]$$

The above-mentioned opening percentage may be calculated on the basis of proportional control with a proportionality constant $\epsilon$. However, it is also possible to calculate opening percentage on the basis of proportional integral control with an integral coefficient $\xi$ in order to calculate $X+\Delta X$ according to the following equation (17) instead of equation (14):

$$X = X' + \epsilon(\theta ps - \theta p) + \xi \int (\theta ps - \theta p)dt \quad (17)$$

Figure 4:
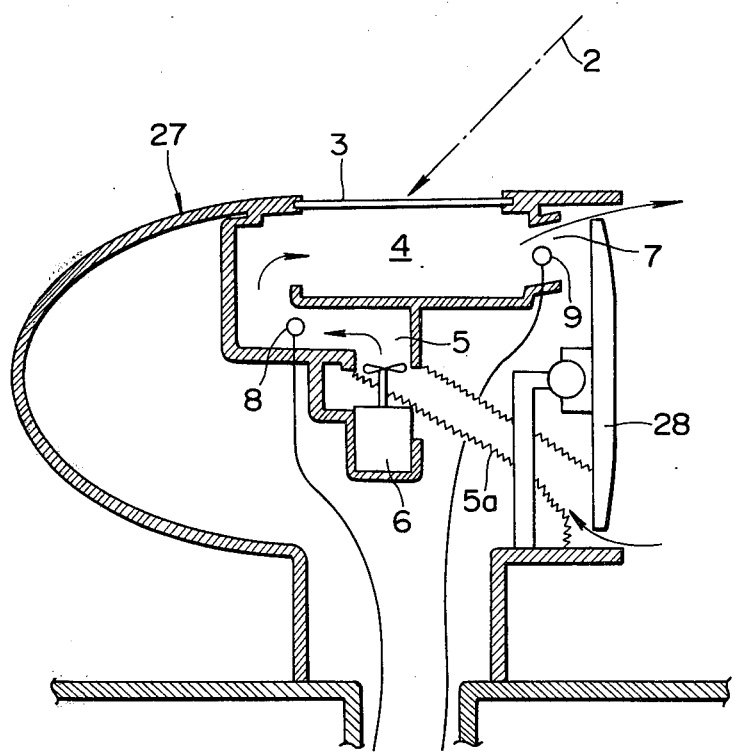
FIG. 4 is a cross-sectional view of a second embodiment of the solar radiation heat influx sensor according to the present invention, which is disposed within a fender mirror housing of an automotive vehicle.

FIG. 4 shows a second embodiment according to the present invention, in which the sensor body is provided within a fender mirror housing for an automotive vehicle.

In the figure, a small chamber 4 is formed within a fender mirror housing 27 having an adjustable mirror 28. A window 3 is provided at the top of the fender mirror housing 27 to collect rays of sunlight 2. A small blower 6 is disposed at an air inlet 5 of the small chamber 4. An air duct 5a guides air driven by the blower 6 from a gap between the bottom of the mirror 28 and the housing 27 to the air inlet 5. The air passes through the chamber 4 and out through another gap between the top of the mirror 28 and the housing 27. An outside-air temperature sensor 8 is mounted in the air inlet 5, and a warmed-air temperature sensor 8 is mounted in the air outlet 7.

When the sensor body according to the present invention are installed within a fender mirror housing, it should be appreciated that since rays of sunlight incident upon the sensor are not shaded by the other portions of the vehicle, whenever sunlight also falls upon the vehicle, rays of sunlights fall upon the fender mirror housing. The result that is it possible to more reliably detect solar radiation heat influx.

Additionally, since the mirror housing also serves to protect and cover the sensor body, there are no problems from the standpoint of appearance or strength.

In this embodiment it is also desirable that the small chamber 4 be painted to match as closely as possible the color of the vehicle interior in order to more accurately simulate the solar heating characteristics of the passenger compartment and thus more accurately measure solar heat influx.

Figure 6:
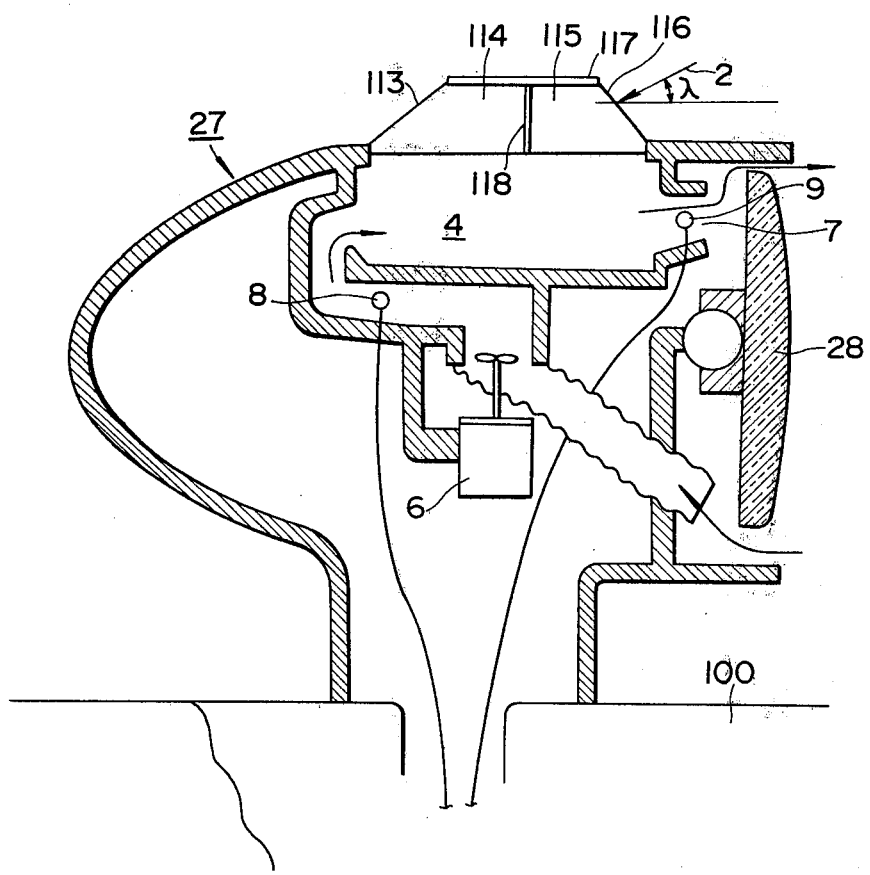
FIG. 6 is a cross-sectional view of a third embodiment of the solar radiation heat influx sensor according to the present invention, which is disposed within a fender mirror of an automotive vehicle, having a window similar to that of a passenger compartment of the vehicle.

FIG. 6 shows a third embodiment of the solar radiation heat influx sensor according to the present invention, which is disposed within a fender mirror housing for an automotive vehicle and has a window structure modeled after the windows and windshields of the passenger compartment of the vehicle.

In the first and second embodiments according to the present invention, the solar radiation heat influx into a passenger compartment Qs is calculated on the basis of an equivalent light-receiving area $S_2$ which is the mean value of the effective light-receiving area of the vehicle over all values of the angle $\lambda$ of incidence of sunlight 7.

However, the incidence angle of sunlight varies. For instance, as shown in FIG. 5, when sunlight falls upon only the front windshield 102 of the vehicle 100 or only upon the rear windshield 101, both the effective light-receiving area and the intensity of sunlight passing through the windows varies, with the result that there exists an error range of about 50 percent. Furthermore, since the angle of inclination of the front and rear windshields differ, the calculated solar radiation heat influx Qs may not correspond to the actual solar radiation heat influx into the passenger compartment; that is, it is impossible to accurately control passenger compartment air temperature under all conditions.

In FIG. 6, a fender mirror housing 27 is provided with a small glass window including a model front windshield 113, model side windows 114 and 115, a model rear window 116, a model roof 117 which is opaque, a model pillar 118, etc., which are all similar in shape to the real windows of the vehicle 100. That is, a small model of the passenger compartment of a vehicle is mounted on the fender mirror housing 27, so that the configuration of the small chamber 4 is similar to that of the rear passenger compartment.

As described already, solar radiation heat influx Qs can be derived from equation (4) as follows:

$$Qs = \frac{S_2}{S_1} qCp(\theta s - \theta a)$$

where $S_1$ is the light-receiving area of the small chamber 4 provided within the fender mirror housing 27, and $S_2$ is a surface equivalent to the light-receiving area of the vehicle 100.

Although the light-receiving area $S_1$ of the small chamber 4 and the light-receiving area $S_2$ of the vehicle vary according to the angle $\lambda$ of incidence of sunlight 2, the small window model provided on the fender mirror housing 27 is similar to that of the vehicle 100, and thus the ratio of $S_2$ to $S_1$ is constant regardless of the angle $\lambda$ of incidence. Since it is possible to accurately calculate solar radiation heat influx Qs by inputting the respective temperatures $\theta a$ and $\theta s$ detected by the outside-air temperature sensor 8 and the warmed-air temperature sensor 9, with the configuration of FIG. 6 it is possible to accurately control passenger compartment air temperature.

Figure 7:
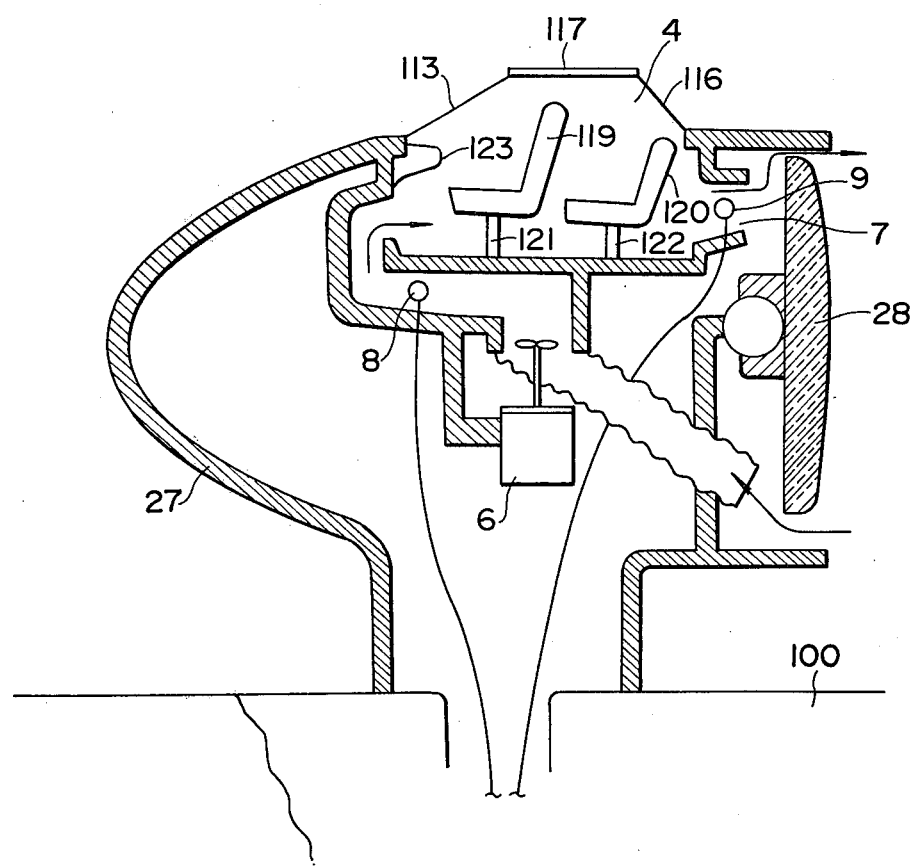
FIG. 7 is a cross-sectional view of a fourth embodiment of the solar radiation heat influx sensor according to the present invention, which is disposed within the fender mirror, having model seats similar to the ones disposed within the passenger compartment.

FIG. 7 shows a fourth embodiment according to the present invention, which includes model seats similar to ones disposed within the real passenger compartment.

As will be well understood in FIG. 7, it is even more realistic to dispose small model seats 119 and 120, preferably matching the real seats of the vehicle 100 in shape, color, and material, and a small model instrument dashboard 123, etc. within the small chamber 4. As with the embodiment of FIG. 6, the model windows 113, 114, 115 and 116 and the model roof 117 are designed to match the real ones in heat conductivity and in light transmittivity.

Figure 8:
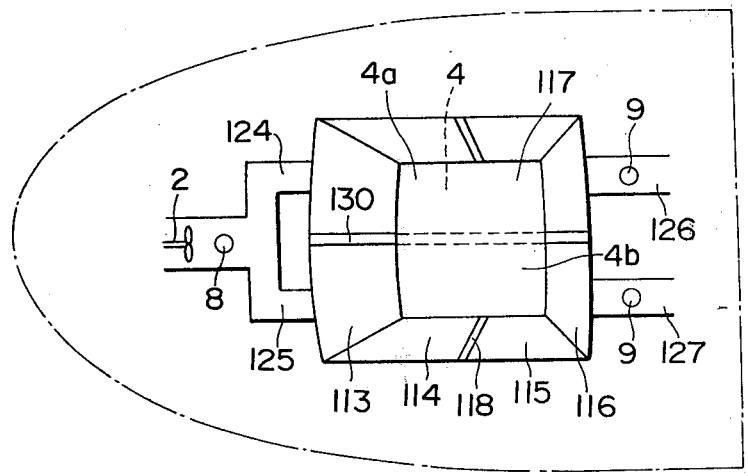
FIG. 8 is a plan view of a fifth embodiment of the solar radiation heat influx sensor according to the present invention, which is disposed within the fender mirror having a longitudinal partition within the model window.

FIG. 8 shows a fifth embodiment according to the present invention.

In this embodiment, there is provided a first partition 130 made of a transparent material dividing the small model vehicle within the small chamber 4 into two sections (right and left side) longitudinally. Inlets 124 and 125 and outlets 126 and 127 are disposed at the longitudinal ends of the halves 4a and 4b of the small chamber 4, respectively. One outside-air temperature sensor 8 is positioned in a passageway common to the two inlet ducts 124 and 125 and two warmed-air temperature sensors 9 are positioned in outlets 126 and 127 respectively.

Figure 9:
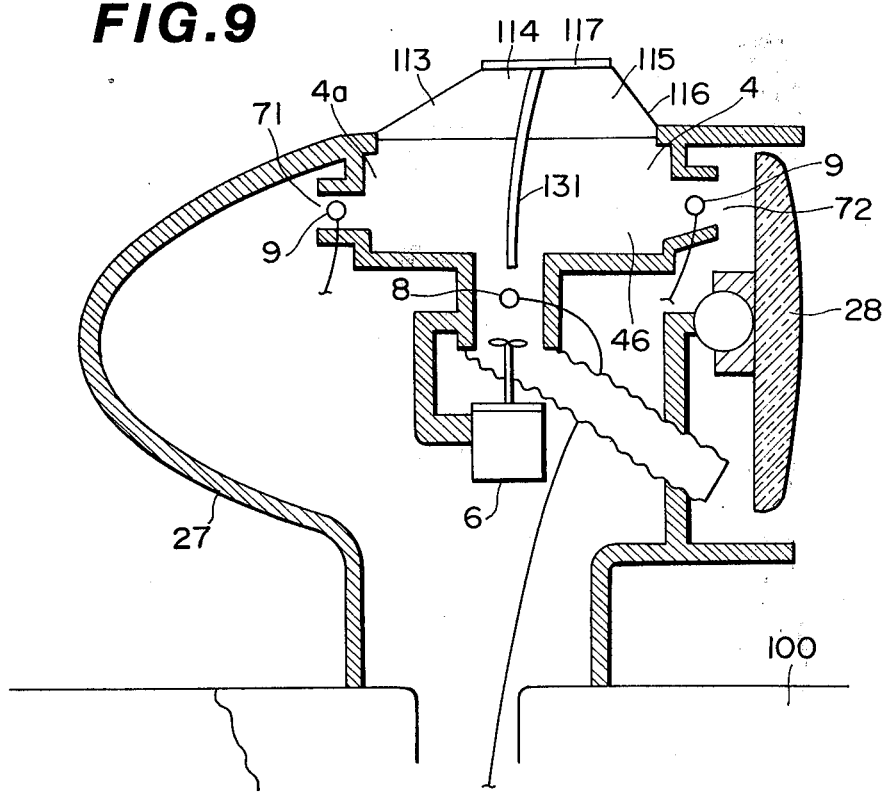
FIG. 9 is a cross-sectional view of a sixth embodiment of the solar radiation heat influx sensor according to the present invention, which is disposed within the fender mirror, having a lateral partition within the model window.

FIG. 9 shows a sixth embodiment according to the present invention. In this embodiment, there is provided a second partition 131 made of a transparent material dividing the small model vehicle within the small chamber 4 into two sections (front and rear) laterally. Two outlets 71 and 72 are disposed at opposite longitudinal ends of the small chamber 4 with a warmed-air temperature sensor 9 at each outlet. Description of the other elements is omitted here since they are simlar to those in the previously described embodiments.

In the above-mentioned fifth and sixth embodiments, two warmed-air temperature sensors 9 are used for detecting respective warmed-air temperatures front and back or on the right and left side of the small chamber 4 divided by the partition 130 or 131, respectively. Therefore, even if sunlight is more intense on one side (front or back, or right or left) of the vehicle 100, it is possible to reliably control the passenger compartment air temperature, according to solar radiation conditions, by separately controlling the temperature of the air outputted from the front or back and the right and left side of the air-conditioning system of the vehicle 100.

As described above, in the solar radiation heat influx sensor according to the present invention, since solar radiation heat influx can be detected on the basis of the difference in temperature between inbound and outbound air flowing through the small chamber upon which rays of sunlight fall, it is possible to easily and reliably obtain the solar radiation heat influx into the passenger compartment. As a result, it is possible to reliably control air conditioning within the passenger compartment regardless of variations in solar radiation.

Further, in the third-to-sixth embodiments according to the present invention, since there is provided a small model vehicle on the outside of a vehicle, and since the difference in air temperature between an inlet and an outlet for air forcedly passed through the model is detected, it is possible to reliably control passenger compartment air temperature under all solar radiation conditions. Furthermore, by dividing the small chamber with the partition, it is possible to more accurately adjust the air temperature control parameters.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A solar radiation heat influx sensor adapted to be mounted on an automotive vehicle having windows for determining heat influx into a passenger compartment due to sunlight, comprising:

(a) a sensor body having an air inlet portion and an air outlet portion at opposite ends thereof and a model window having similar solar characteristics to the vehicle windows, said model window being disposed between the air inlet and outlet portions of said sensor body and operable to receive rays of sunlight incident on said vehicle;

(b) means for driving air through said sensor body from the air inlet portion to the air outlet portion;

(c) an outside-air temperature sensor disposed in the air inlet portion of said sensor body for detecting the temperature of air flowing into said sensor body;

(d) a warmed-air temperature sensor disposed in the air outlet portion of said sensor body for detecting the temperature of air flowing out of said sensor body; and (e) a calculating unit, connected to said outside-air temperature sensor and said warmed-air temperature sensor, for calculating heat influx into the passenger compartment due to sunlight on the basis of signals generated by said outside-air temperature sensor and said warmed-air temperature sensor in accordance with a predetermined equation, and for outputting a command signal corresponding thereto.

2. A solar radiation heat influx sensor as set forth in claim 1, wherein said sensor body, said means for driving air through said sensor body, said outside-air temperature sensor, and said warmed-air temperature sensor are disposed within a fender mirror housing adapted to be mounted on said automotive vehicle.

3. A solar radiation heat influx sensor as set forth in claim 1, wherein the predetermined equation is $$Qs = \frac{S_2}{S_1} qCp(\theta s - \theta a)$$

where q is the volumetric flow rate of air from the inlet portion to the outlet portion, Cp is the gravimetric specific heat of air, $\theta s$ is the temperature detected by said warmed-air temperature sensor, $\theta a$ is the temperature detected by said outside-air temperature sensor, $S_1$ is the surface area of the opening, and $S_2$ is the equivalent mean light-receiving area of the vehicle.

4. A solar radiation heat influx sensor as set forth in claim 1 or 2, wherein said model window is similar in shape to the vehicle windows.

5. A solar radiation heat influx sensor as set forth in claim 4, wherein said model window comprises a model front windshield, a model rear window, and two model side window, said sensor body further comprising a model roof, and two model pillars similar in shape to a corresponding roof and pillars of the vehicle.

6. A solar radiation heat influx sensor as set forth in claim 5, wherein said model front windshield, roof, rear and side windows, and pillars are substantially similar in heat conductivity and light transmittivity as corresponding elements of the vehicle.

7. A solar radiation heat influx sensor as set forth in claim 4, said sensor body further comprising model passenger seats, and a model instrument dashboard.

8. A solar radiation heat influx sensor as set forth in claim 7, wherein said model passenger seats and model instrument dahsboard are substantially similar in shape, color, material and the like to corresponding seats and dashboard of the vehicle.

9. A solar radiation heat inflex sensor as set forth in claim 4, wherein said sensor body further comprises:
   (a) a partition made of a transparent material for dividing said model window into a right side section having a right side air inlet portion and a right side air outlet portion and a left side section having a left side air inlet portion and a left side air outlet portion, the right and left side air inlets being connected to each other, said outside-air temperature sensor being disposed in a passage common to the right and left inlet air portions; and
   (b) a warmed-air temperature sensor disposed in each of the right and left side air outlet portions.

10. A solar radiation heat influx sensor as set forth in claim 4, wherein said sensor body further comprises:
   (a) a partition made of a transparent material for dividing said model window into a front side section having a front side air inlet portion and a front side air outlet portion and a rear side section having a rear side air inlet portion and a rear side air outlet portion, the front and rear side air inlets being connected to each other, said outside-air temperature sensor being disposed in a passage common to the front and rear air inlet side portions; and
   (b) a warmed-air temperature sensor disposed in each of the front and rear side air outlet portions.

11. The solar radiation heat influx sensor of claim 1 further comprising an air-conditioning system, mounted in said vehicle and asssociated with said solar radiation heat influx sensor, said air-conditioning system having an air mix door for controlling the temperature of the air admitted into said passenger compartment, and means for controlling the position of said air mix door, wherein said calculating unit is operable to generate said command signal to operate said means for controlling the position of the air mix door.

12. A solar radiation heat influx sensor, mounted on an automotive vehicle in a fender mirror housing, for detecting heat influx into a passenger compartment due to sunlight, comprising:
   (a) a sensor body having an air inlet portion and an air outlet portion at opposite ends thereof and a window between said inlet and outlet portions;
   (b) means for driving air through said sensor body from the air inlet portion to the air outlet portion;
   (c) an otuside-air temperature sensor disposed in the air inlet portion of said sensor body for detecting the temperature of air flowing into said sensor body;
   (d) a warmed-air temperature sensor disposed in the air outlet portion of said sensor body for detecting the temperature of air flowing out of said sensor body;
   (e) a calculating unit, connected to said outside-air temperature sensor and said warmed-air temperature sensor, for calculating heat influx into the passenger compartment due to sunlight on the basis of signals generated by said outside-air temperature sensor and said warmed-air temperature sensor in accordance with a predetermined equation, and for outputting a signal corresponding thereto;
wherein said sensor body, said means for driving air through said sensor body, said outside-air temperature sensor, and said warmed-air temperature sensor are disposed within the fender mirror housing.

* * * * *